United States Patent [19]

Shibaike

[11] Patent Number: 4,812,931
[45] Date of Patent: Mar. 14, 1989

[54] ARRANGEMENT FOR SETTING AND DISCHARGING OF A CASSETTE IN ELECTRONIC STILL CAMERA

[75] Inventor: Narito Shibaike, Osaka, Japan

[73] Assignee: Matsushita Electric Industrial Co., Ltd., Osaka, Japan

[21] Appl. No.: 924,490

[22] Filed: Oct. 29, 1986

[30] Foreign Application Priority Data

Nov. 1, 1985 [JP] Japan .................. 60-246570
Nov. 1, 1985 [JP] Japan .................. 60-246574
Nov. 1, 1985 [JP] Japan .................. 60-246575

[51] Int. Cl.$^4$ .............................. G11B 5/012
[52] U.S. Cl. .................. 360/99.06; 360/96.6
[58] Field of Search ............ 360/97, 99, 96.5, 96.6, 360/92; 358/906, 335, 909

[56] References Cited

U.S. PATENT DOCUMENTS

| | | | |
|---|---|---|---|
| 3,833,224 | 9/1974 | Haake ................... | 360/96.6 |
| 4,071,859 | 1/1978 | Sami .................... | 360/96.5 |
| 4,334,251 | 6/1982 | Sato .................... | 360/96.6 |
| 4,586,097 | 4/1986 | Koike et al. ........... | 360/97 |
| 4,652,949 | 3/1987 | Muraoka ............... | 360/96.5 |
| 4,665,453 | 5/1987 | Mikamoto et al. ..... | 360/99 |
| 4,686,593 | 8/1987 | Watanabe et al. ..... | 360/96.6 |
| 4,694,362 | 9/1987 | Oosaka et al. ........ | 360/97 |

FOREIGN PATENT DOCUMENTS

| | | |
|---|---|---|
| 0143598 | 6/1985 | European Pat. Off. . |
| 1233160 | 1/1967 | Fed. Rep. of Germany . |
| 7609642 | 3/1976 | Fed. Rep. of Germany . |
| 2911568 | 2/1980 | Fed. Rep. of Germany . |

Primary Examiner—Stuart N. Hecker
Assistant Examiner—David J. Severin
Attorney, Agent, or Firm—Pollock, Vande Sande & Priddy

[57] ABSTRACT

Disclosed is a recording apparatus for recording information by a recording head on a recording sheet in a cassette set therein. The recording apparatus basically includes a cassette receiving compartment coaxially rotatable with a cover of the recording apparatus and a slide member movable in response to a setting of a cassette in the cassette receiving compartment. The slide member is coupled through a spring to a base plate of the recording apparatus and is locked by a stopper member in response to a termination of the setting of the cassette. The cassette is inserted into the cassette receiving compartment in the direction parallel to the rotational axis of the cover. When released from the stopper member, the slide member discharges the cassette from the cassette receiving compartment.

4 Claims, 7 Drawing Sheets

ARRANGEMENT FOR SETTING AND DISCHARGING OF A CASSETTE IN ELECTRONIC STILL CAMERA

BACKGROUND OF THE INVENTION

The present invention relates generally to a recording apparatus, and more particularly to an arrangement for the setting and discharging of a cassette in and from a cassette receiving compartment of a recording apparatus.

Generally, a cassette type recording apparatus requires setting a cassette therein and discharging the cassette therefrom. An important aspect of portable type recording apparatus such as electronic still camera is compact structure; and therefore, improvement for the portable type recording apparatus is being recently made for size-reduction and simple construction. One possible solution is to simplify the arrangement for the setting and discharging of the cassette in and from a cassette receiving section. However, these requirements are difficult to meet because the setting of the cassette is performed independently of the discharging thereof. Therefore, it would be advantageous to provide an association between the setting and discharging of the cassette with a view to achieving compact and simple construction.

SUMMARY OF THE INVENTION

It is therefore an object of the present invention to provide an improved arrangement for setting and discharging of a cassette in a portable type recording apparatus.

With this object and features which will become apparent as the description proceeds, a recording apparatus according to the present invention basically comprises a cassette receiving compartment coaxially rotatable with a cover of the recording apparatus and a slide member movable in response to a setting of a cassette in the cassette receiving compartment. The slide member is coupled through a spring to a base plate of the recording apparatus and is locked by a stopper member in response to a termination of the setting of the cassette. The cassette is inserted into the cassette receiving compartment in the direction parallel to the moving direction of the slide member. When released from the stopper member, the slide member discharges the cassette from the cassette receiving compartment.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1A:
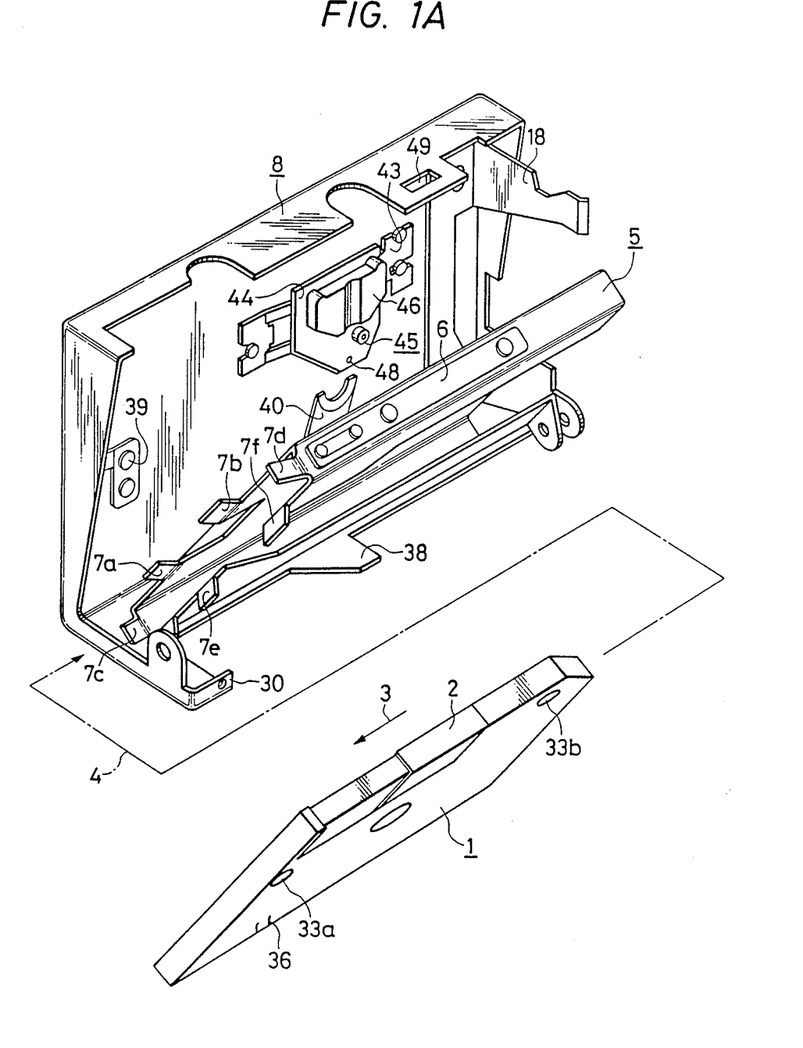
FIG. 1A is a perspective view showing a garage and compartment of a recording apparatus according to the present invention.
Figure 1B:
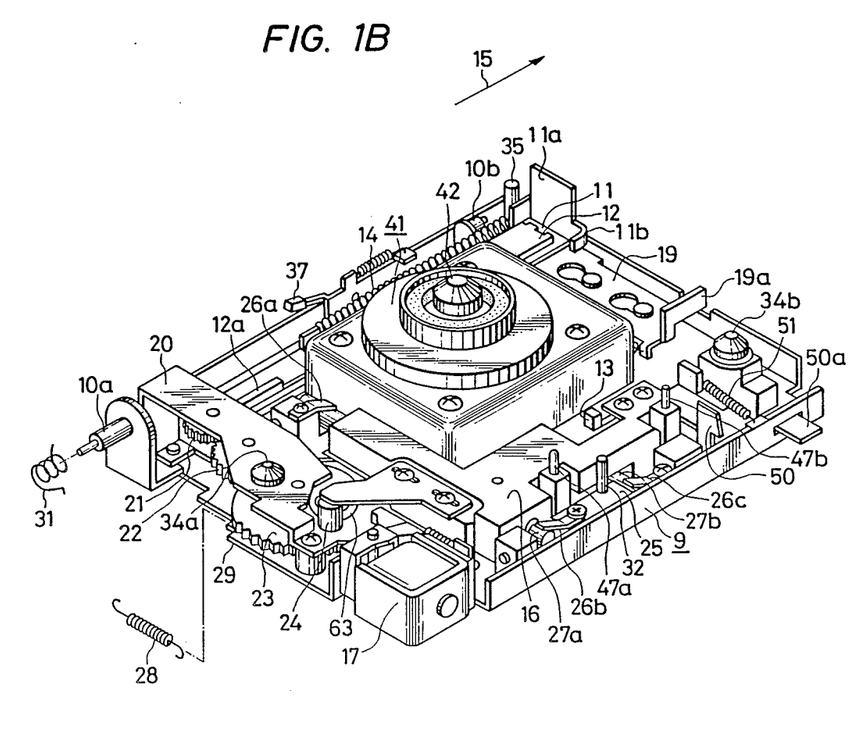
FIG. 1B is a perspective view illustrating an arrangement of a recording head drive section of a recording apparatus according to the present invention.

Referring now to FIGS. 1A and 1B, there is schematically illustrated a recording apparatus according to the present invention. Designated at reference numeral 1 (FIG. 1A) is a cassette in which a magnetic sheet is encased. The cassette 1 has a head insertion inlet (which will be described hereinafter) which is normally covered by a shutter 2 movable in the direction indicated by an arrow 3. When the cassette 1 is slidingly inserted into a compartment 5 from the direction of an arrow 4, the shutter 2 will be opened with the aid of a shutter releasing device 6 provided on the compartment 5. On the other hand, when the cassette 1 is removed from the compartment 5, it will be automatically closed by the shutter releasing device 6. The compartment 5 has, at the cassette insertion side, a plurality of guide pieces 7a to 7f to enable easy insertion of the cassette 1. A garage 8 is disposed at the outer side of the compartment 5, and the garage 8 and the compartment 5 are pivotally coupled through support shafts 10a and 10b (FIG. 1B) to a base plate 9 of the recording apparatus. The support shafts 10a and 10b are disposed such that their axes are parallel to the direction of the cassette insertion, i.e., the direction of the arrow 4. The cassette 1 is adapted to be inserted into the compartment 5 with it being inclined with respect to the base plate 9.

Further included in the recording apparatus according to this invention, shown in FIG. 1B, are two slide plates 11 and 12 each of which respectively has an elongated configuration and which are disposed in up and down relation to each other, that is, which overlap each other. In the figure, the slide plate 12 is disposed at the upside of another slide plate 11. The cassette 1 is operatively associated with the slide plate 11, that is, the slide plate 11 is slidable in response to the insertion of the cassette 1. During the insertion, one end of the cassette 1 comes into contact with a bent portion 11a of the slide plate 11 and depresses it in the insertion direction indicated by an arrow 15 in FIG. 1B. The slide plates 11 and 12 are coupled to each other through a spring 14, and the slide plate 11 is coupled through another spring 60 (which will be described hereinafter) to the base plate 9. Therefore, the insertion of the cassette 1 is performed against the spring forces and generates biasing force of the springs 14 and 60. The bent portion 11a has a hook 11b and, when the insertion of the cassette 1 has been completed, the hook 11b is arranged to be catched with a stopper plate 19, whereby the generated biasing forces of the springs 14 and 60 remains charged. The slide plates 11 and 12 respectively function as a biasing-force charging member. The biasing force generated between the slide plates 11 and 12 is used for driving a recording head 13, which will be described in detail hereinafter.

When the garage 8 is opened as shown in FIG. 1A (FIG. 1A shows the state of the garage 8 being opened at a greater degree than the actually opened degree, for the purpose of illustration), a release spring plate 18 connected to the garage 8 is engaged with, or comes into contact with, a protruding portion 19a of the stopper plate 19 to move the stopper plate 19 so that the hook 11b of the slide plate 11 can be disengaged from the stopper plate 19 and the slide plate 11 can be released therefrom. In response to the release from the stopper plate 19, the slide plate 11 is moved by the urging force of the spring 60 in the opposite direction with respect to the direction indicated by the arrow 15. This opposite direction movement causes the cassette 1 to be discharged by the bent portion 11a from the compartment 5 to the outside thereof. At the same time, the biasing force between the slide plates 11 and 12 is lost and the slide plate 11 depresses the slide plate 12. The movement of the slide plate 12 caused thereby is delivered through a rack 12a, and gears 21, 22 to a ratchet 23 so that a cam 63 returns to the initial position. In response to the return of the cam 63 to the initial position, a slider 16 brings the recording head 13 back to its initial position. The slider 16 is moved along slide shafts 27a and 27b held by presser springs 26a to 26c (leaf springs) and an adjusting screw (which will be described hereinafter). The slider 16 is normally spring-urged toward the cam 63 so that the cam 63 comes into contact with a cam follower 24.

The garage 8 is associated with the base plate 9 through a spring 28, that is, one end of a spring 28 is coupled to a spring-connecting portion 29 of the base plate 9 and the other end thereof is coupled to a spring-connecting portion 30 so that the garage 8 is biased in the direction that it is opened, that is, it is swingingly separated from the base plate 9. The compartment 5 is urged by a spring 31 in the direction that it is separated from the garage 8.

When the garage 8 is moved downwardly to be closed after the cassette 1 is inserted into the compartment 5, the compartment 5 is moved downwardly together with the garage 8 and then comes into contact with a height-determining pin 32, and the cassette 1 is positioned because positioning pins 34a, 34b are respectively fitted in positioning holes 33a, 33b of the cassette 1 and also positioned in height by the positioning pins 34a, 34b and a height-determining pin 35. When it is closed, a switch 37 to be associated with a safety lug 36 of the cassette 1 is still pressed by a projecting portion 38 of the garage 8 and moved up to a position separated from the cassette 1 (which will be described hereinafter). Thereafter, when the garage 8 is further moved downwardly, the cassette 1 is held by a presser spring 39; and an insertion spring 40 causes a center core (which will be described hereinafter) to be engaged with a spindle 42 of a motor 41. Furthermore, a pad 46 and a PG (pulse generator) 45 are attached to a pad plate 44 held on the garage 8 by a pad spring 43, and they come into contact with height-determining pins 47a, 47b. In addition, a height adjusting screw 48 attached to the pad plate 44 comes into contact with the center portion of the spindle 42 for height-positioning. Thereafter, a locking hole 49 defined in the garage 8 is engaged with a locking member 50 so that the garage 8 is secured to the base plate 9. The connection between the locking hole 49 and the locking member 50 can be released by pressing a push member 50a against a spring 51.

A more detailed description of the recording apparatus according to the present invention will be made hereinbelow with reference to FIGS. 2 to 9B.

Figure 2:
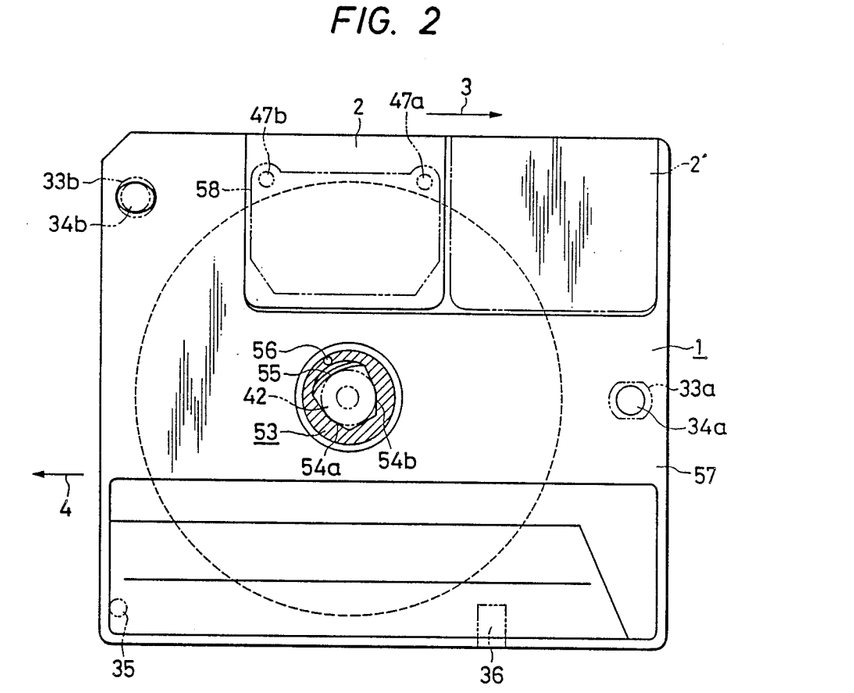
FIG. 2 is an illustration of a magnetic sheet holding cassette used for a recording apparatus of this invention.

FIG. 2 is an illustration of a cassette used for the recording apparatus according to the present invention.

A magnetic sheet 52 encased in the cassette 1 is provided around a center core 53, which is provided with positioning walls 54a, 54b, and a positioning spring 55 for positioning it with respect to the spindle 42. A PG yoke 56 is also provided thereon. A housing 57 has the positioning holes 33a, 33b which are engaged with the positioning pins 34a, 34b. Illustrated at numeral 58 are a pair of windows which are provided at opposite sides of the cassette 1 and which are exposed when the shutter 2 is slid up to the position indicated by numeral 2'. The height-determining pins 47a, 47b pass through the window 58 to come into contact with the pad 46.

Figure 3:
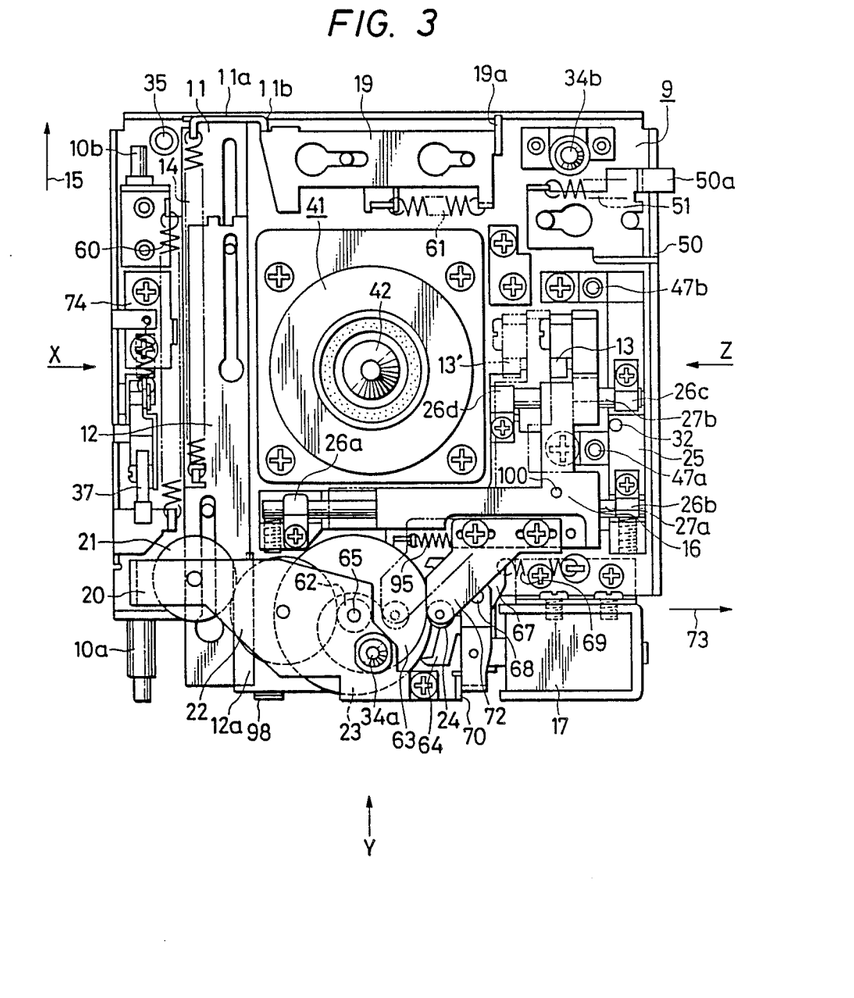
FIG. 3 is a top view showing the head drive section illustrated in FIG. 1B.

FIG. 3 is a top view showing an arrangement, except for the cassette 1 and garage 8, of the recording apparatus according to this invention.

Figure 4:
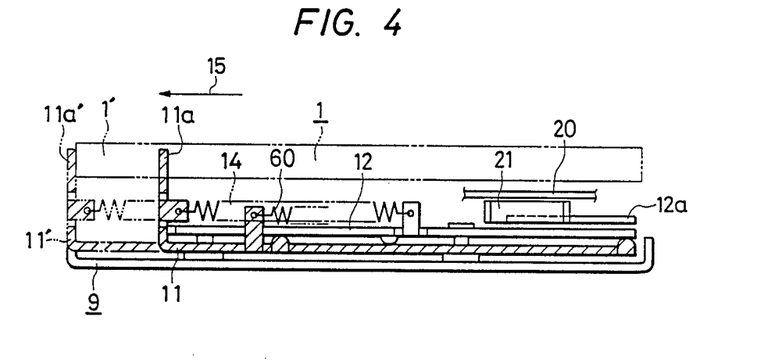
FIG. 4 is a cross-section of the recording apparatus viewed from the direction of an arrow X in FIG. 3.

The slide plate 11 is slidingly moved against the spring 60 in the direction indicated by arrow 15 with the cassette 1 being inserted into the compartment 5 and is locked by the stopper plate 19 at a predetermined position (corresponding to the termination position of the cassette insertion) as illustrated in FIG. 4 which is a cross-section viewed from the direction of an arrow X of FIG. 3. While the slide plate 11 is not released from the stopper plate 19 when the garage 8 is moved downwardly, when moved upwardly the release spring plate 18 (FIG. 1A) presses the protruding portion 19a of the stopper plate 19 against a spring 61 which is provided between the base plate 9 and the stopper plate 19 and therefore the engagement between the slide plate 11 and the stopper plate 19 is released and the slide plate 11 can be moved in the direction opposite to the direction of the arrow 15 under the biasing force caused by the spring 60. On the other hand, the slide plate 12 is moved together with the slide plate 11. The movement of the slide plate 12 is delivered through gates 21, 22, 62 and the ratchet 23 to the cam 63, resulting in rotation of the cam 63, as seen from FIG. 5 which is a cross-section viewed from the direction of an arrow Y in FIG. 3.

As described above, in response to the opening of the garage 8, the cassette 1 is discharged from the compartment 5 and the cam 63 is returned to its initial position. The return of the cam 63 to its initial position causes the recording head 13 to be returned to its initial position.

Next, a description will be made with respect to insertion of the cassette 1.

As shown in FIG. 4, the cassette 1 is inserted substantially parallel to the surface of the base plate 9, or in other words the cassette 1 is inserted with the longitudinal axis thereof in parallel to the axes of the shafts 10a and 10b, and moves the slide plate 11 in the direction of the arrow 15 up to the position indicated by numeral 11', as described above. On the other hand, the slide plate 12 is not moved with the movement of the slide plate 11 because the ratchet 23 is engaged with the pointer 64. Therefore, A tensile force is generated by the spring 14 between the slide plates 11 and 12, the slide plate 12 being urged toward the slide plate 11, i.e., the direction of the arrow 15.

Figure 6A:
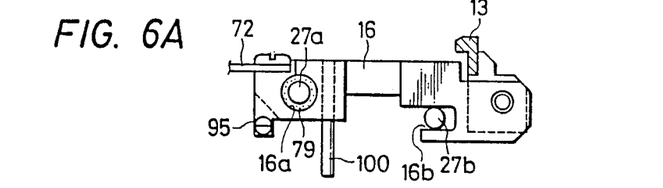
FIG. 6A is a side view showing a recording head carrying mechanism used for the recording apparatus of this invention.
Figure 6B:
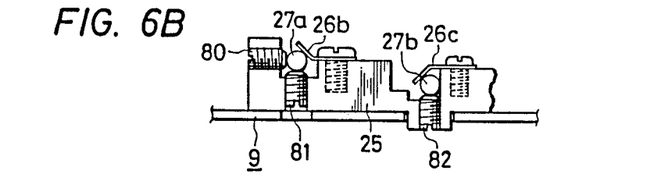
FIG. 6B is a side view showing the recording head carrying mechanism.

FIGS. 6A and 6B are illustrations useful for describing the slider 16 and its associated members.

The recording head 13 is secured to the slider 16 which is guided by the slide shafts 27a and 27b which are substantially parallel to each other. The slide shaft 27a is inserted into a hole 16a of the slider 16. Numeral 79 represents a bush. On the other hand, the slide shaft 27b is fitted in a groove 16b defined in the slider 16. Therefore the slider 16 is positioned by the slide shafts 27a and 27b. The slide shaft 27a is held by two adjusting screws 80, 81 and the presser spring 26b with respect to the slide block 25, and is adjustable in up-and-down and right-and-left positions by means of the two adjusting screws 80 and 81. The other end portion of the slide shaft 27a, not shown, is similarly held. The slide shaft 27b is held by an adjusting screw 82 and presser spring 26c so as to be adjustable in up-and-down positions. The other end portion of the slide shaft 27b, not shown, is similarly held with the same arrangement. Thus, since the slide shafts 27a and 27b are respectively adapted to be adjustable in position, it is possible to accurately position the recording head 13. Furthermore, the relationship in position between the cam 63 and the slider 16 is adjustable by means of an adjusting plate 72.

A description is given hereinbelow with respect to the opening and closing of the garage 8 with reference to FIGS. 7A and 7B.

Figure 5:
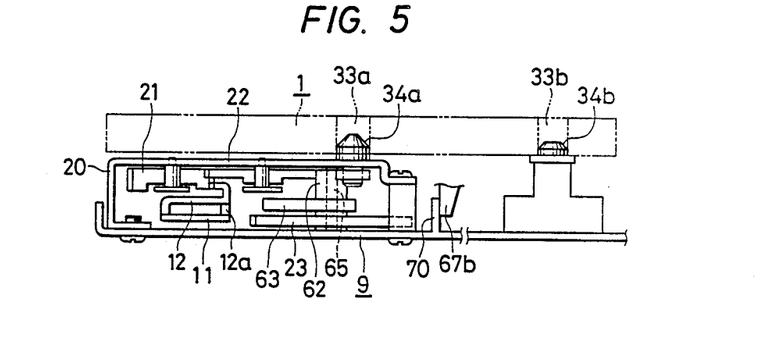
FIG. 5 is a cross-section of the recording apparatus viewed from the direction of an arrow Y in FIG. 3

In the recording apparatus according to the present invention, account is taken with respect to the garage 8 being opened at as small a degree as possible for the insertion and removal of the cassette 1. For example, the positioning pins 34a and 34b for positioning the cassette 1 are positioned away from the support shafts 10a and 10b for the garage 8 and compartment 5 as shown in FIG. 5. Minimizing the opening degree of the garage 8 results in prevention from entering of dust and so on.

Figure 7A:
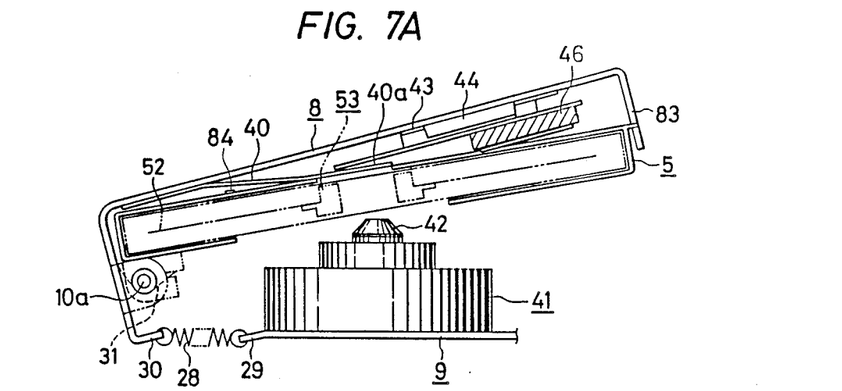
FIG. 7A is a cross sectional view showing the state of the garage of the recording apparatus being opened.
Figure 7B:
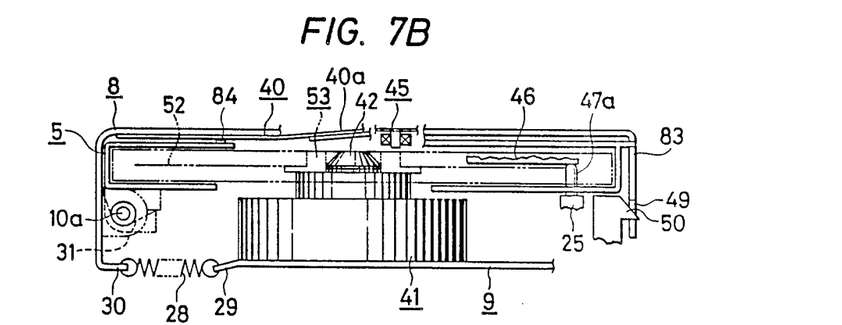
FIG. 7B is a cross sectional view showing the state of the garage of the recording apparatus being closed.

FIG. 7A shows the state when the garage 8 is opened and FIG. 7B illustrates the state when the garage 8 is closed. When the garage 8 is moved to be closed, the cassette 1 is set to the motor 41 with the compartment 5 being separated from the garage 8 by means of a spring 31. The garage 8 is further moved downwardly and at this time insertion spring 40 presses the center core 53 of the cassette 1 so that the spindle 42 is perfectly inserted into the center core 53. The insertion spring 40 has an elongated configuration and is, at one end portion, secured to the garage 8 and presses the center core 53 at the other end portion thereof. In response to a further movement of the garage 8, a convex portion 84 of the compartment 5 provided at the position facing the insertion spring 40 comes into contact with the insertion spring 40 and therefore one end portion 40a of the insertion spring 40 is moved upwardly and separated from the center core 53. This prevents the insertion spring 40 from affecting the rotation of the center core 53. This arrangement is simple and certainly performs the insertion of the spindle 42 into the center core 53 and separation from the center core 53. The PG 45 and pad 46 provided on the pad plate 44 are accurately positioned by the pad spring 43, positioning pin 47a and so on.

Figure 8:
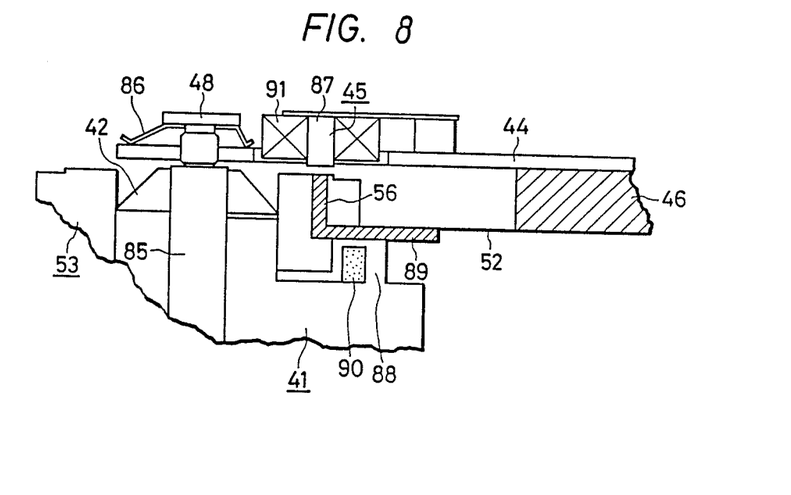
FIG. 8 is a cross sectional view partially illustrating the state of the garage being closed.

The pad 46 comes into contact with the positioning pins 47a and 47b and is positioned in height. As shown in FIG. 8, the pad plate 44 is provided with a height adjusting screw 48 which is positioned above the center portion 85 of the motor 41 and which is urged by a spring 86 to prevent the adjusting screw 48 from loosing. Thus, it is ensured to accurately position the recording head 13 with respect to the magnetic sheet 52, and PG pin 87 with respect to PG yoke 56. The PG yoke 56 is integrally secured to a magnetic plate 89 which holds the magnetic sheet 52 and which comes into contact with a pedestal of the motor 41. The PG yoke 56 transfers the magnetic force from a magnet 90 to a PG pin 87. This is detected by a coil 91 which in turn generates a pulse signal.

Figure 9A:
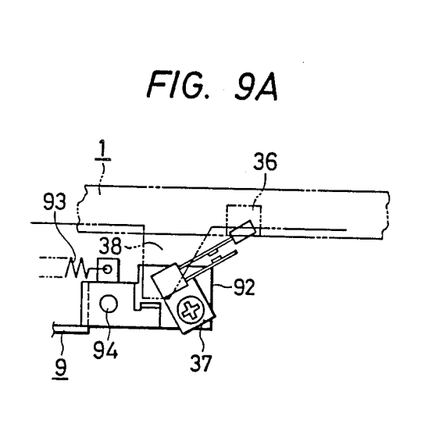
FIGS. 9A and 9B are illustrations of an arrangement for the removal of a safety switch associated with a safety lug of the cassette of FIG. 2.
Figure 9B:
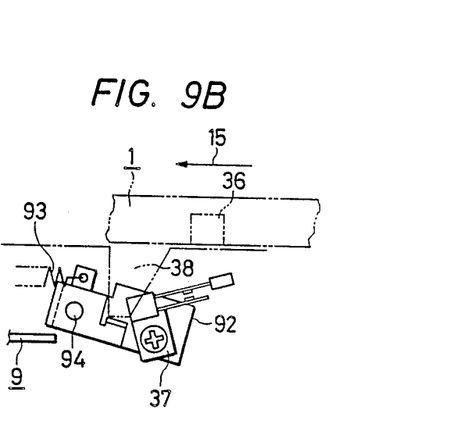

When the cassette 1 is inserted and removed, it will be required to remove the switch 37 associated with the (safety lug) 36. Therefore, as shown in FIGS. 9A and 9B, the garage 8 is provided with a projecting portion 38, and when the garage 8 is opened or when the cassette 1 is discharged from the compartment 5, the projecting portion 38 thereof is arranged to move a switch plate 92 against a spring 93 and separates the switch 37 from the cassette 1. That is, the switch plate 92 is pivotally secured to the side wall of the base plate 9 by a shaft 94 and one end portion thereof relative to the shaft 94 is biased by the spring 93. The other end portion thereof is pressed by the projecting portion 38 and rotated against the spring 93 in the direction that it is separated from the compartment 5.

It should be understood that the foregoing relates to only preferred embodiments of the invention, and that it is intended to cover all changes and modifications of the embodiments of the invention herein used for the purposes of the disclosure, which do not constitute departures from the spirit and scope of the invention.

What is claimed is:

1. A recording apparatus for recording information by a recording head on a recording medium in a cassette positioned in said recording apparatus, comprising:
    a shaft member provided on a chassis of said recording apparatus;
    a cover held pivotally on said shaft member so as to be rotatable about said shaft member and to be opened and closed with respect to said chassis, said cover having first pressing spring means and cassette-positioning means on a surface thereof facing said chassis;
    a cassette receiving compartment held pivotally on said shaft member so as to be coaxial with said cover and rotatable, said compartment being positioned between said cover and said chassis and having an opening for insertion and discharge of said cassette, the insertion and discharge directions being parallel to the axis of said shaft member, said compartment being loosely engaged with said cover so as to be movable in accordance with the opening movement of said cover;
    second spring means biasing said compartment so as to separate the same from said cover by a predetermined degree which is determined by a loosely engaged relation between said compartment and said cover, whereby said compartment is kept obliquely between said cover and said chassis and allows the insertion of said cassette from said opening into said compartment with said cover being opened;
    a slide member held slidably on said chassis and coupled through third spring means to said chassis, said slide member engagable with said cassette and slidable in directions parallel to the axis of said shaft member in response to said cassette being inserted from said opening into said compartment with said compartment being kept obliquely therebetween; and
    stopper means engagable with said slide member at termination of the insertion of said cassette so as to hold said cassette at a termination position and disengagable therewith when said cover is opened so that said cassette is discharged from said compartment;

wherein, in response to the insertion of said cassette, said slide member slides against a biasing force of said third spring means produced by the insertion of said cassette and is held by said stopper means at the termination position, and wherein when said cover is closed after the termination of the insertion of said cassette, said first pressing spring means presses and said cassette-positioning means positions said cassette at a predetermined position on said chassis; and whereby after termination of a recording, said slide member is released from said stopper member in response to the opening of said cover and discharges said cassette from said compartment by means of the biasing force of said third spring means with said compartment being kept obliquely with respect to said chassis.

2. A recording apparatus as claimed in claim 1, wherein said cassette receiving compartment has shutter opening means for opening a shutter of said cassette when said cassette is inserted thereinto so that said recording head can approach said recording medium through a window exposed by the opening of said shutter, said window being positioned away from said axis.

3. A recording apparatus as claimed in claim 1, wherein said cover has removing means near said shaft member for removing a switch for detecting the presence of a safety lug provided on said cassette, said safety lug detecting switch being held by a plate member pivotally supported by said chassis and one end portion of said plate member being biased by a fourth spring means in a predetermined direction so that said switch approaches said safety lug, said removing means being engagable with the other end portion of said plate member to press the other end portion thereof when said cover is opened to discharge said cassette from said cassette receiving compartment, whereby said plate member is rotated against a biasing force of said fourth spring means to cause said switch to be separated from said safety lug of said cassette.

4. A recording apparatus as claimed in claim 1, wherein the first pressing spring means of said cover includes an elongated pressing member
one end portion of which is fixedly secured to one end portion of said surface of said cover and other end portion of which extends at a predetermined angle with respect to said surface of said cover toward a center portion of said cover so as to come into contact with a center core of said cassette and press the same in response to the closing movement of said cover with respect to said chassis whereby said core is perfectly fitted with a spindle of a recording medium driving motor of said recording apparatus, and wherein said cassette receiving compartment has a projecting portion on a surface thereof facing said cover which positioned between the secured position of the one end portion of said elongated pressing member and said core of said cassette and which has a predetermined height so as to separate the other end portion of said elongated pressing member from said core thereof in response to termination of the closing movement of said cover.

* * * * *